US011998903B2

United States Patent
Alekseenko et al.

(10) Patent No.: US 11,998,903 B2
(45) Date of Patent: Jun. 4, 2024

(54) METHOD FOR PRODUCING CATALYSTS WITH NANOPARTICLES OF PLATINUM AND ITS ALLOYS WITH METALS

(71) Applicant: ZeroAvia, Inc., Hollister, CA (US)

(72) Inventors: Anastasia Anatolyevna Alekseenko, Rostov-on-Don (RU); Sergey Valerievich Belenov, Rostov-on-Don (RU); Vladimir Efimovich Guterman, Rostov-on-Don (RU)

(73) Assignee: ZeroAvia, Inc., Hollister, CA (US)

( * ) Notice: Subject to any disclaimer, the term of this patent is extended or adjusted under 35 U.S.C. 154(b) by 263 days.

(21) Appl. No.: 16/942,364

(22) Filed: Jul. 29, 2020

(65) Prior Publication Data
US 2021/0008535 A1    Jan. 14, 2021

(51) Int. Cl.
*B01J 37/34*    (2006.01)
*B01J 23/42*    (2006.01)
(Continued)

(52) U.S. Cl.
CPC ............ *B01J 37/348* (2013.01); *B01J 23/42* (2013.01); *B01J 35/50* (2024.01); *C25B 9/17* (2021.01); *B01J 21/185* (2013.01)

(58) Field of Classification Search
None
See application file for complete search history.

(56) References Cited

U.S. PATENT DOCUMENTS

2003/0224926 A1    12/2003    Xing et al.

FOREIGN PATENT DOCUMENTS

CN  101152627 A  4/2008
RU  2367520 C1  9/2009
(Continued)

OTHER PUBLICATIONS

Matsuda et al., Theoretical study of CO2 adsorption on Pt, New J. Chem., 2019, 43, 13717-13720, teaches the adsorption of CO2 on platinum. (Year: 2019).*

(Continued)

*Primary Examiner* — Coris Fung
*Assistant Examiner* — Keling Zhang
(74) *Attorney, Agent, or Firm* — Osha Bergman Watanabe & Burton LLP (57) ABSTRACT

The method allows to produce catalysts with nanoparticles of platinum and its alloys with metals of a given composition, with high values of catalytic activity in an oxygen electroreduction reaction, and with predetermined values of structural characteristics. The method comprises preparation of a solution of chloroplatinic acid or a mixture of chloroplatinic acid with metal salts, mixing thereof with dispersed carbon or non-carbon carriers, their mixtures and compositions with specific surface area of more than 60 m²/g, dispersion of the obtained mixture, chemical reduction of compounds of platinum and a metal salt with subsequent deposition of nanoparticles of metallic platinum or its alloys on a dispersed carrier being carried out by purging gases selected from: nitrogen oxides ($N_2O$, NO, $NO_2$), carbon oxides (CO, $CO_2$), sulfur oxide ($SO_2$), ammonia ($NH_3$) or their mixtures through the solution at a temperature of the solution in the range from 5 to 98° C.

1 Claim, 4 Drawing Sheets (51) Int. Cl.
  *B01J 35/50* (2024.01)
  *C25B 9/17* (2021.01)
  *B01J 21/18* (2006.01)

(56) References Cited

FOREIGN PATENT DOCUMENTS

RU 2415707 C2 4/2011
RU 2695999 C1 7/2019

OTHER PUBLICATIONS

Bartram et al., Coadsorption of nitrogen dioxide and oxygen on Pt(111), Langmuir, 1988, 4, 240-246, teaches the adsorption of NO2 on platinum. (Year: 1988).*

Wang et al., Nitrogen oxide electrochemical reduction characteristics on patterned platinum electrode, Solid State Ionics, 2015, 277, 57-64, teaches the adsorption of NO on platinum. (Year: 2015).*

Guterman et al., Synthesis of Nanostructured Pt/C Electrocatalysts and Effects of Ambient Atmosphere Composition and an Intermediate Support on Their Microstructure; 2015, vol. 52, No. 1, pp. 23-28.

Kirakosyan et al., Effect of CO Atmosphere on Morphology and Electrochemically Active Surface Area in the Synthesis of Pt/C and PtAg/C Electrocatalysts, 2016, vol. 11, pp. 287-296.

Alekseenko et al., Impact of the atmosphere composition in the process of synthesis on the morphology and electrochemical performance of Pt/C electrocatalysts, 2017, pp. 2899-2907.

Alekseenko et al., Application of CO atmosphere in the liquid phase synthesis as a universal way to control the microstructure and electrochemical performance of Pt/C electrocatalysts, 2018, pp. 608-615.

* cited by examiner

Example 5

Example 8

Example 16

Example 24

Example 26

METHOD FOR PRODUCING CATALYSTS WITH NANOPARTICLES OF PLATINUM AND ITS ALLOYS WITH METALS

FIELD

The present disclosure relates to the field of chemical current sources, in particular to chemical methods for applying metal coatings from solutions of platinum group metals and their alloys with each other and with other metals on carbon or non-carbon carriers, and can be used for producing catalysts used, in particular, in low-temperature fuel cells (LTFCs) and electrolyzers.

BACKGROUND

This section provides a general summary of the disclosure, and is not a comprehensive disclosure of its full scope or all of its features.

The best catalysts for the cathode and anode of low-temperature fuel cells (methanol, phosphoric acid, hydrogen-air fuel cells with a proton exchange membrane) are composite materials consisting of nanoparticles of platinum or its alloys deposited on a surface of an electronically conductive carrier. With the same potential, a rate of current-forming electrochemical reactions on platinum and its alloys is much higher than on other materials, which allows achieving maximum power characteristics in fuel cells. Since reactions proceed on the platinum surface, then, in order to increase it, this precious metal is used in the form of nanoparticles in which a fraction of surface atoms is very large. In addition, platinum is one of the most thermodynamically stable metals, which provides an acceptable service life (durability, stability) of catalysts.

As the carrier materials for platinum nanoparticles, finely dispersed graphitized carbon materials (carbon black, nanotubes, nanofibers, graphene, etc.), which have a highly developed surface and high electronic conductivity, are most often used. Dispersed materials based on oxides, nitrides, carbides, metal carbonitrides and mixtures thereof can be also used as carriers. The use of a foreign carrier for placing platinum nanoparticles on its surface is conditioned by the tendency of the nanoparticles to agglomerate, therefore their independent separate existence for a long time is impossible. The interaction between a metal nanoparticle and the surface of a carrier facilitates the fixation of the nanoparticle and, thereby, prevents its agglomeration with other nanoparticles. As a result, a high degree of dispersion of the metal, and, consequently, a high specific surface area is maintained for a long time. Nevertheless, catalyst degradation processes associated with platinum corrosion, agglomeration of nanoparticles and detachment of a part of nanoparticles from the surface of a carrier actually occur during the operation of fuel cells and in cases when platinum or alloy nanoparticles are fixed to the surface of a carrier (Thompsett D.//Catalysts for the Proton Exchange Membrane Fuel Cell, in: Handbook of Fuel Cells. Fundamentals, Technology and Applications. Editors: Vielstich W., Lamm A., Gasteiger H. A. Sohn, Wiley & Sons Ltd., New York, USA, 2003. Vol. 3. P. 6-1-6-23).

Since redox reactions in a fuel cell actually occur on a surface of metal nanoparticles, a decrease in their size leads to an increase in the specific surface area of the catalyst and an increase in the specific reaction rate (current density) per unit mass of metal (Pt). It was found, however, that upon transition to nanoscale particles characterized by a high degree of surface disordering, the specific catalytic activity of the metal decreases per unit of its true surface. As a result, with a decrease in the size of the nanoparticles, two factors appear that oppositely affect the activity of the catalyst: the specific surface area of the metal (Pt) increases, and the specific electrocatalytic activity decreases. This presupposes the existence of an optimal nanoparticle size corresponding to the highest catalyst activity (Hubert A. Gasteiger, Shyam S. Kocha, Bhaskar Sompalli, Frederick T. Wagner: Activity benchmarks and requirements for Pt, Pt-alloy, and non-Pt oxygen reduction catalysts for PEMFCs, Applied Catalysis B: Environmental 56, 2005, 9-35).

Significance of such an optimal nanoparticle size is not precisely determined, since it depends not only on the composition and structure of the nanoparticles themselves, but also on their operating conditions in the membrane-electrode blocks of fuel cells. However, most of known literature sources consider the range from 1.5 to 5 nm as the optimal average size of nanoparticles. When selecting or producing catalysts, it is important to understand that their activity and stability inversely relate to the size of platinum nanoparticles (Guterman V. E., Belenov S. V., Alekseenko A. A., Tabachkova N. Yu., Volochaev V. A.: On the relationship of the activity and stability of supported platinum-carbon electrocatalysts, Russian Journal of Electrochemistry, 2017, v. 53, No. 5, pp. 531-539).

In view of the foregoing, an electrocatalyst of a fuel cell (electrolyzer) must combine high activity and sufficient corrosion-morphological stability during operation. Both these characteristics depend on the structure and composition of a catalyst. Taking into account that operating conditions of a cathode and an anode differ in the same way as operating conditions of catalysts in different types of low-temperature fuel cells, it becomes necessary, while developing them, to produce catalysts with a given and sufficiently small average size of metal nanoparticles, narrow dispersion of their size distribution and uniform distribution over the surface of a carrier (absence of aggregates) and strong adhesion to it. The fulfillment of these requirements is necessary for the selection of a catalyst that optimally combines the characteristics of stability and activity in relation to specific operating conditions of a fuel cell.

The most common methods for producing supported platinum-containing catalysts are those associated with a chemical reduction of platinum compounds in a suspension containing carrier particles or in a gas phase under conditions of previous application of platinum compounds on a surface of carrier particles. Such methods are practically feasible; they allow to produce Pt/X (where X is a carrier material) materials with sufficiently high characteristics. Thus, the production of catalysts with a high degree of dispersion of deposited metal particles provides a method for production of platinum catalysts (patent RU 2415707) that are metal-carbon compositions based on platinum nanoparticles fixed on a surface of porous carbon carriers with a metal content of 15-wt %, which consists in pre-saturation of the surface of a carrier with adsorbed platinum complex compounds that, during the subsequent hydrolytic deposition of platinum from a solution, turn into surface platinum oxides and initiate autocatalytic growth of nanoparticles of deposited platinum oxides, and their deposition is carried out from solutions of the composition: chloroplatinic acid ($H_2PtCl_6$)+an alkaline agent+an organic reducing agent, and the final recovery of the applied platinum is carried out in a stream of hydrogen at a temperature of 120-250° C.

However, this method requires to carry out several successive stages, including processing of the materials both in solution and, at a relatively high temperature, in the gas phase containing hydrogen. As the main characteristic of such a catalyst, the authors indicate an average size of platinum nanoparticles, which, for catalysts with a mass fraction of platinum of 20% and based on carbon carriers with a surface area of 200-300 m$^2$/g (C), varies in the range of 2.3-4.2 nm. At the same time, such important characteristics of electrocatalysts as size distribution of nanoparticles, an area of the electrochemically active surface of platinum, the activity in the electrochemical reaction in comparison with a standard (commercial) Pt/C catalyst sample remain unknown. The control of the nanoparticles size during the synthesis of catalysts is carried out not only by changing the medium composition or the synthesis conditions, but also through various types of pretreatment of the carbon carrier itself and the use of different types of carbon carriers.

A method for producing a catalyst for a fuel cell is known (patent RU 2367520), which comprises preparing a solution of chloroplatinic acid or a mixture of chloroplatinic acid with metal salts in aqueous organic solvents containing up to 95% of a non-aqueous component, mixing them with carbon powder, dispersing a mixture thus obtained by ultrasound, and chemical reduction of platinum compounds and another alloy component.

The advantages of this method, selected as the prototype, include the ability to produce a catalyst based on platinum alloys and the ability to produce catalysts with specified values of an average particle diameter in the range of 2-5 nm.

The disadvantages of this method include its low practical feasibility, in particular the use of specific organic solvents that require careful washing of the catalyst. The destruction products of some of these solvents, for example, dimethyl sulfoxide, which are capable of being irreversibly sorbed by the catalyst components and poisoning the active centers of platinum during subsequent operation of the catalyst, are even more dangerous. However, it is variation of the composition of water-dimethyl sulfoxide solutions that is proposed for control of an average size of nanoparticles. The use of sodium borohydride as a reducing agent makes it difficult to scale the synthesis due to the very rapid reaction with this reagent. With a significant volume of solution, the reaction mixture will not have time to mix up. The specific currents of oxygen electroreduction on the prepared catalysts are lower than the analogous currents obtained on commercial catalysts with a similar platinum content, for example, HiSPEC 3000 (Johnson Matthey).

Methods for producing a catalyst for a fuel cell with a metal particle size of 2.5-5 nm are known in the art, which include deposition of platinum sols or colloidal solutions on a surface of dispersed carbon materials. However, such methods of synthesizing Pt/C are suitable only for the production of catalysts in small quantities. They require the use of expensive organic solvents, include operations with organometallic compounds, are sensitive to medium components (H. Boennemann et al., J. New Mater. Electrochem. Syst. 3, 2000, 199).

Other variants of "colloidal" synthesis methods require the use of highly diluted colloidal solutions and suspensions of a carbon carrier 0.5-2.5 g/L (M. Watanabeatal., J. Electroanal. Chem. 229, 1987, 395). A serious problem is removal of residues of organic surfactants that stabilize colloidal solutions from finished catalysts.

SUMMARY

The technical task of the claimed invention is to develop a high-tech method for producing catalysts with nanoparticles of platinum and its alloys with metals of a given composition (a mass fraction of platinum in Pt/X and mass fractions of both metals in Pt$_y$M/X), which exhibits high values of catalytic activity in the oxygen electroreduction reaction and given values of structural characteristics: small and medium sized nanoparticles of platinum in combination with a narrow size distribution; high uniformity of the nanoparticle distribution on the surface of the carrier; a great area of the electrochemically active surface of platinum.

The stated technical effect is achieved by the proposed method for producing catalysts with nanoparticles of platinum and its alloys with metals. The method comprises preparing a solution of chloroplatinic acid or a mixture of chloroplatinic acid with metal salts in water or in an aqueous-organic solvent containing a non-aqueous component, mixing it with a powder of dispersed carbon or non-carbon carriers, their mixtures and compositions with a specific surface of more than 60 m$^2$/g, dispersion of the resulting mixture. In addition, the chemical reduction of platinum compounds and a metal salt with the subsequent deposition of nanoparticles of metal platinum or its alloys onto a dispersed carrier is carried out by purging gases selected from: nitrogen oxides ($N_2O$, $NO$, $NO_2$), carbon oxides ($CO$, $CO_2$), a sulfur oxide ($SO_2$), ammonia ($NH_3$), or mixtures thereof through a solution having a temperature in the range from 5 to 98° C., while adjusting an average size of the formed nanoparticles of platinum or its alloys by selecting a gas to be purged, a composition of the solution, a carrier, a reducing agent, a temperature and a time interval from the start of the liquid-phase synthesis process until the moment when a gas stream of one of the above gases passes through the reaction mixture.

A distinctive feature of the proposed method is synthesis in an atmosphere of any of the above gases or their mixtures, when they are purged through a reaction mixture. During synthesis in air, oxygen molecules are adsorbed on the surface of a carrier material and growing platinum nanoparticles. When synthesis is carried out in an atmosphere of nitrogen or argon, gas molecules are practically not adsorbed on the surface of carrier particles and nanoparticles of platinum or its alloy. The effect of the composition of an atmosphere (gas mixture) on a microstructure of a catalyst is conditioned by a change in the composition of adsorption layers that form both on the surface of the carrier material and on the surface of growing platinum nuclei. This changes a number of active centers on the surface of the carrier, the activation energy of nucleation, the activation energy of the growth of platinum (alloy) nuclei, which results in a change in an average size of formed nanoparticles and uniformity of their distribution over the surface of the carrier material. The shell surrounding the nanoparticles that is formed from molecules of the corresponding gases complicates their agglomeration. As a result, an area of the electrochemically active surface and, consequently, the mass activity of the catalysts can be significantly increased. Solvent molecules and other particles initially present in the reaction medium or formed during the reaction to a greater or lesser extent compete with the molecules of the transmitted gas(es) as an adsorbent and, in the presence of these gases, to a greater or lesser extent influence the growth of platinum nuclei. Catalysts produced in the atmosphere of $NO$, $NO_2$, $CO$, $SO_2$ have a higher electrochemically active surface area in comparison with analogs synthesized in an air atmosphere or in nitrogen and argon atmospheres, which is conditioned by a small size of platinum nanoparticles in combination with their narrow size distribution. Unlike materials synthesized in atmospheres of air, nitrogen, or argon, values of the electrochemically active surface of catalysts produced in an atmosphere of NO, $NO_2$, CO, $SO_2$ poorly depend on the nature of a reducing agent and synthesis conditions. These catalysts demonstrate the highest mass activity values in the oxygen electroreduction reaction, superior to those of analogs synthesized in air and commercial Pt/C catalysts HiSPEC 3000 (20 wt. % of Pt), HiSPEC 4000 (40 wt. % of Pt). Catalysts produced in an atmosphere of $CO_2$ and $NH_3$ are characterized by higher stability in comparison with analogs synthesized in an air atmosphere, argon and nitrogen atmospheres, which is conditioned by stronger adhesion of platinum nanoparticles to the carrier. In addition, in this case, loss of precious metal is minimized (product yield approaches 100%).

The invention is new, since use of the method of chemical reduction of platinum or its alloys in a liquid aqueous or aqueous-organic mixture in combination with purging streams of gaseous nitrogen oxides ($N_2O$, NO, $NO_2$), carbon (CO, $CO_2$), sulfur ($SO_2$) or ammonia ($NH_3$) through a solution (suspension) that are used to replace an air or inert (argon, nitrogen) atmosphere for organic surfactants that influence the nucleation/growth of nanoparticles and their adsorption on the particle surface carrier, while decreasing, maintaining or controlling sizes of platinum (alloy) nanoparticles produced and while increasing the uniformity of their distribution over the surface of the carrier, is not known in the art. The possibility of producing platinum-carbon catalysts with specified structural characteristics (a size of nanoparticles and an area of the electrochemically active surface of platinum) by controlling a time interval from the start of liquid-phase synthesis to the start of purging a gas or gas mixture stream through the reaction mixture, and also by controlling a composition of a gas mixture is also unknown in the art.

The technical effect of this invention is the creation of a simple, universal and affordable way to control the structure of Pt/X, $Pt_yM/X$ catalysts in the process of their liquid-phase synthesis. Catalysts with specified values of structural characteristics, produced in an atmosphere of these gases, have a great electrochemically active surface area and, as a consequence, high mass activity in the oxygen electroreduction reaction. When the synthesis is complete, gas molecules can be easily removed from the surface of Pt nanoparticles and the carrier by using standard methods of washing and drying synthesized materials.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

TABLES AND DRAWINGS

The tables and drawings described herein are for illustrative purposes only of selected embodiments and not all possible implementations, and are not intended to limit the scope of the present disclosure.

Table 1 illustrates synthesis conditions and composition characteristics.

Table 2 illustrates comparative characteristics of the activity of Pt/C catalysts.

DETAILED DESCRIPTION

Example embodiments will now be described more fully with reference to accompanying drawings.

The synthesis of a catalysts was carried out by chemical reduction of platinum from a solution of $H_2PtCl_6·6H_2O$ (Aurat, Russia). When preparing a solution of chloroplatinic acid as an organic component, ethylene glycol, ethanol, isopropanol, dimethyl sulfoxide, dimethylformamide, propylene glycol, glycerol, acetone can be used. Vulcan XC-72 graphitized carbon black (Cabot Corp., $S_{BET}$=250-280 $m^2/g$) was used as the carrier material for nanoparticles of platinum or its alloys, but dispersed carbon and non-carbon materials with a specific surface area more than 60 $m^2/g$ could be used, including carbon black, carbon nanofibers and nanotubes, graphene, fullerenes, oxides of tin, titanium, zirconium, cerium and other metals, nitrides and oxynitrides of titanium, zirconium, molybdenum and other metals, carbides and carbonitrides of tungsten, tantalum, zirconium and other metals, as well as other types of dispersed materials.

The carrier material can be pre-treated by holding it in a solution of acids, alkalis or salts in different concentrations and at different temperatures, subject to heat treatment in an atmosphere of air, argon, nitrogen, hydrogen, ammonia or other gases and mixtures thereof.

As a reducing agent, it is possible to use formic acid, sodium borohydride, potassium borohydride, formaldehyde, ethylene glycol, hydrazine, hydroxylamine and other reducing agents.

The synthesis was carried out in an air atmosphere and by purging gases, such as nitrogen oxides ($N_2O$, NO, $NO_2$), carbon oxides (CO, $CO_2$), sulfur oxide ($SO_2$) or ammonia (NH₃), as well as mixtures thereof through a suspension (reaction mixture) at a suspension temperature from 5 to 98° C.

Example 1. 0.1 g of Vulcan XC-72 carbon carrier (specific surface area 250-280 m²/g) is placed in a solution containing 10 mL of water, and 10 mL of ethylene glycol, 0.066 g of chloroplatinic acid hexahydrate (H₂PtCl₆·6H₂O) is added. The resulting suspension is dispersed by ultrasound. The reaction mixture is purged with an NO₂ stream. Without stopping the purge of NO₂, 25 mL of 0.1M formic acid is added. The synthesis is carried out for 1 hour: 0.5 hours at the temperature of 90° C. and 0.5 hours without heating.

In the result, a catalyst was produced with the platinum content of 15.2 wt %, the average particle size of 1.3 nanometers, and the electrochemically active surface area of 135 m²/g (Pt).

Example 2. The process is similar to that described in Example 1, but 0.114 g of chloroplatinic acid hexahydrate (H₂PtCl₆·6H₂O) is added. In the result, a catalyst was produced with the platinum content of 27.0 wt %, the average particle size of 1.8 nanometers, and the electrochemically active surface area of 93 m²/g (Pt).

Example 3. The process is similar to that described in Example 1, but 0.397 g of chloroplatinic acid hexahydrate (H₂PtCl₆·6H₂O) and 40 mL of 0.1M formic acid are added.

In the result, a catalyst was produced with the platinum content of 57.3 wt %, the average particle size of 3.0 nanometers, and an electrochemically active surface area of 68 m²/g (Pt).

Example 4. The process is similar to that in Example 1, but the Vulcan XC-72 carbon carrier is placed in 10 mL of a 10% solution of isopropanol in water and 60 mL of ethylene glycol is added which acts as a reducing agent in the synthesis process. The mixture obtained after dispersion and containing chloroplatinic acid is alkalized to adjust the pH of the solution to 6. The synthesis is carried out at a temperature of 98° C.

In the result, a catalyst was produced with the platinum content of 16.5 wt %, the average particle size of 1.2 nanometers, and the electrochemically active surface area of 130 m²/g (Pt).

Example 5. The process is similar to that in Example 1, but 0.178 g of chloroplatinic acid hexahydrate (H₂PtCl₆·6H₂O) is added. In the result, a catalyst was produced with the platinum content of 38.1 wt %, the average particle size of 2.4 nanometers, and the electrochemically active surface area of 79 m²/g (Pt).

Example 6. The process is similar to that described in Example 1, but 0.030 g of chloroplatinic acid hexahydrate (H₂PtCl₆·6H₂O) is added.

In the result, a catalyst was produced with the platinum content of 8.4 wt %, the average particle size of 1.0 nanometers, and the electrochemically active surface area of 152 m²/g (Pt).

Example 7. The process is similar to that described in Example 1, but the synthesis is carried out at a temperature of 65° C.

In the result, a catalyst was produced with the platinum content of 18 wt %, the average particle size of 1.4 nanometers and the electrochemically active surface area of 105 m²/g (Pt).

Example 8. The process is similar to that described in Example 1, but the purging of NO₂ through the reaction mixture is started 5 minutes after the latter is heated to 90° C. (i.e. 5 minutes after the start of synthesis).

In the result, a catalyst was produced with the platinum content of 15.9 wt %, the average particle size of 1.5 nanometers, and the electrochemically active surface area of 128 m²/g (Pt).

Example 9. The process is similar to that described in Example 1, but the purging of NO₂ through the reaction mixture is started 10 minutes after the latter is heated to 90° C. (i.e. 10 minutes after the start of synthesis).

In the result, a catalyst was produced with the platinum content of 15.9 wt %, the average particle size of 3.6 nanometers, and the electrochemically active surface area of 69 m²/g (Pt).

Example 10. The process is similar to that described in Example 1, but the purging of NO₂ through the reaction mixture is started 20 minutes after the latter is heated to 90° C. (i.e. 20 minutes after the start of synthesis).

In the result, a catalyst was produced with the platinum content of 18.6 wt %, the average particle size of 4.7 nanometers, and the electrochemically active surface area of 52 m²/g (Pt).

Example 11. The process is similar to that described in Example 1, but the purging of NO₂ through the reaction mixture is started 30 minutes after the latter is heated to 90° C. (i.e. 30 minutes after the start of synthesis).

In the result, a catalyst was produced with the platinum content of 18.8 wt %, the average particle size of 4.9 nanometers, and the electrochemically active surface area of 50 m²/g (Pt).

Example 12. The process is similar to that in Example 10, but CO is purged through the reaction mixture.

In the result, a catalyst was produced with the platinum content of 17.2 wt %, the average particle size of 4.6 nanometers, and the electrochemically active surface area of 55 m²/g (Pt).

Example 13. The process is similar to that described in Example 4, but 0.212 g of chloroplatinic acid hexahydrate is added and CO₂ was purged through the reaction mixture during the synthesis.

In the result, a catalyst was produced with the platinum content of 44 wt %, the average particle size of 3.0 nanometers, and the electrochemically active surface area of 68 m²/g (Pt).

Example 14. The process is similar to that described Example 13, but VulcanXC-72R was used as the carbon carrier.

In the result, a catalyst was produced with the platinum content of 42.6 wt %, the average particle size of 3.1 nanometers, and the electrochemically active surface area of 67 m²/g (Pt).

Example 15. The process is similar to that described Example 2, but Ketjenblack EC 600JD was used as the carbon carrier.

In the result, a catalyst was produced with the platinum content of 28.0 wt %, the average particle size of 1.6 nanometers, and the electrochemically active surface area of 109 m²/g (Pt).

Example 16. The process is similar to that described in Example 2, but VulcanXC-72 was used as the carbon carrier that was held in the air atmosphere at the temperature of 200° C. for 3 hours.

In the result, a catalyst was produced with the platinum content of 28.7 wt %, the average particle size of 1.8 nanometers, and the electrochemically active surface area of 92 m²/g (Pt).

Example 17. The process is similar to that described in Example 2, but CO₂ was purged through the reaction mixture during the synthesis, and Ketjenblack EC 600JD was used as the carbon carrier that was treated in the air atmosphere at 200° C. for 3 hours.

In the result, a catalyst was produced with the platinum content of 29.7 wt %, the average particle size of 3.2 nanometers, and the electrochemically active surface area of 66 m²/g (Pt).

Example 18. The process is similar to that described in Example 2, but VulcanXC-72 was used as the carbon carrier that was treated with excess of a NaBH₄ aqueous solution for 24 hours.

In the result, a catalyst was produced with the platinum content of 28 wt %, the average particle size of 1.9 nanometers, and the electrochemically active surface area of 88 m²/g (Pt).

Example 19. The process is similar to that described in Example 3, but Ketjenblack EC 300J was used as the carbon carrier.

In the result, a catalyst was produced with the platinum content of 60 wt %, the average particle size of 2.8 nanometers, and the electrochemically active surface area of 74 m²/g (Pt).

Example 20. The process is similar to that described in Example 3, but BlackPearl 2000 was used as the carbon carrier.

In the result, a catalyst was produced with the platinum content of 58.5 wt %, the average particle size of 2.7 nanometers, and the electrochemically active surface area of 79 m²/g (Pt).

Example 21. The process is similar to that described in Example 1, but the Vulcan XC-72 carbon carrier is placed in a solution containing 15 mL of water and 5 mL of glycerol, and formaldehyde is used as the reducing agent which is added to the reaction mixture in the quantity of 1 mL In the result, a catalyst was produced with the platinum content of 18 wt %, the average particle size of 1.4 nanometers, and the electrochemically active surface area of 107 m²/g (Pt).

Example 22. The process is similar to that described in Example 4, but NO is purged through the reaction mixture.

In the result, a catalyst was produced with the platinum content of 15 wt %, the average particle size of 1.2 nanometers, and the electrochemically active surface area of 127 m²/g (Pt).

Example 23. The process is similar to that described in Example 22, but titanium dioxide doped with niobium (specific surface area 70 m²/g) is used as the dispersed carrier. In the result, a catalyst was produced with the platinum content of 19 wt %, the average particle size of 1.2 nanometers and the electrochemically active surface area of 72 m²/g (Pt).

Example 24. The process is similar to that described in Example 22, but tin dioxide doped with antimony (specific surface area 102 m²/g) is used as the dispersed carrier. In the result, a catalyst was produced with the platinum content of 18 wt %, the average particle size of 1.2 nanometers, and an electrochemically active surface area of 81 m²/g (Pt).

Example 25. The process is similar to that described in Example 22, but a mixture containing $H_2PtCl_6 \cdot 6H_2O$ is alkalized with a 0.1M solution of NaOH in water-ethylene glycol solution (1:1) to pH=11, and then 5 mL of a 0.5M sodium borohydride solution is added as the reducing agent. In the result, a catalyst was produced with a platinum content of 18 wt %, the average particle size of 2.8 nanometers, and the electrochemically active surface area of 72 m²/g (Pt).

Example 26. The process is similar to that described in Example 22, but 0.066 g of chloroplatinic acid hexahydrate and 0.01 g of nickel nitrate hexahydrate $(Ni(NO_3)_2) \cdot 6H_2O$ are introduced into the solution as the precursors. In the result, a $Pt_3Ni/C$ catalyst is produced with the platinum content of 17 wt %, the nickel content of 2 wt %, the average alloy nanoparticles size of 2.2 nanometers and the electrochemically active surface area of 90 m²/g (Pt).

All the experimental results are summarized in Table 1 where the synthesis conditions and the characteristics of the composition/structure of the produced catalysts are provided. Table 2 presents the comparative characteristics of the activity of the Pt/C catalysts produced in the atmosphere of the corresponding gas and analogs (produced in the air atmosphere, that is without purging other gases), as well as two commercial Pt/C HiSPEC catalysts (Johnson Matthey) with different mass fractions of platinum.

The catalytic activity in the oxygen electroreduction reaction was determined by the results of voltammetry at a potential sweep at a speed of 20 mV/s in the range from 0.04V to 1.20V relative to a reversible hydrogen electrode (RHE). The measurements were conducted on a rotating disk electrode at rotational speeds of 400, 900, 1,600 and 2,500 rpm at the room temperature in a 0.1M $HClO_4$ solution which was purged with oxygen before measurements for 40 minutes. A thin catalyst layer on the electrode was preliminarily formed by deposition and subsequent drying of a drop of a suspension containing 36 μg of Pt/C. To fix the Pt/C layer, 7 μL of a 0.05% Nafion® solution was applied over the catalyst layer remaining on the electrode after the drop was dried.

The experimental voltammograms were normalized as follows: the electrode potential was determined by the equation $E=E_{reg}-J_i*R$, where: $E_{reg}$ is the measured potential value; J*R is the ohmic potential drop. The electrolyte resistance R was 26 ohms. A correction for background was introduced into the value of current by subtracting the current of a similar voltammogram measured in an argon atmosphere: $J=_{O2}=J_{Ar}$. The catalytic activity of the Pt/C catalyst in the oxygen electroreduction reaction (kinetic current $J_k$) was determined by extrapolating the straight lines obtained on the basis of the normalized voltammograms in the coordinates of the Koutetsky-Levich equation $1/J-1/\omega^{0.5}$ to the ordinate axis.

$$J_k=J_d J/(J_d-J),$$

where: J is the current strength on the voltammogram at the potential of 0.90V (relative to RHE); $J_d$ is the current limited by diffusion; $J_k$ is the kinetic current not limited to slowed mass transfer. The calculated kinetic current values were related to the weight of platinum deposited on the electrode (A/g (Pt)).

Figure 1A:
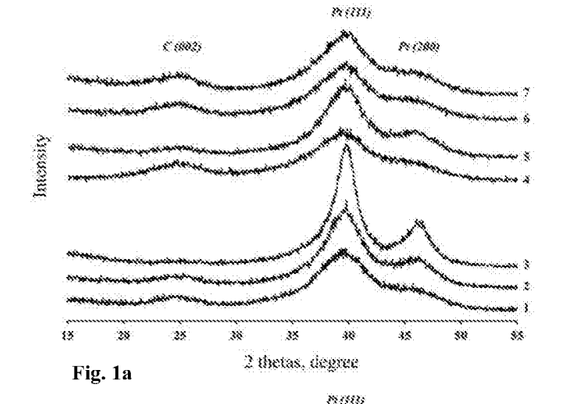
FIG. 1a shows X-ray diffraction patterns of Pt/C samples produced in Examples 1-7.
Figure 1B:
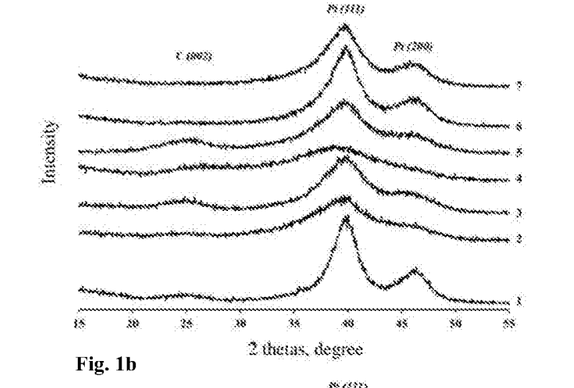
FIG. 1b shows X-ray diffraction patterns of Pt/C samples produced in Examples 14-20 on various carbon carriers: 1—VulcanXC-72R; 2—KetjenblackEC 600JD; 3—VulcanXC-72 held at the temperature of 200° C. in an air atmosphere for 3 hours; 4—Ketjenblack EC 600JD processed at the temperature of 200° C. in an air atmosphere for 3 hours; 5—VulcanXC-72 treated with an excess of an aqueous solution of $NaBH_4$ for 24 hours; 6—Ketjenblack EC 300J; 7—BlackPearl 2000.
Figure 1C:
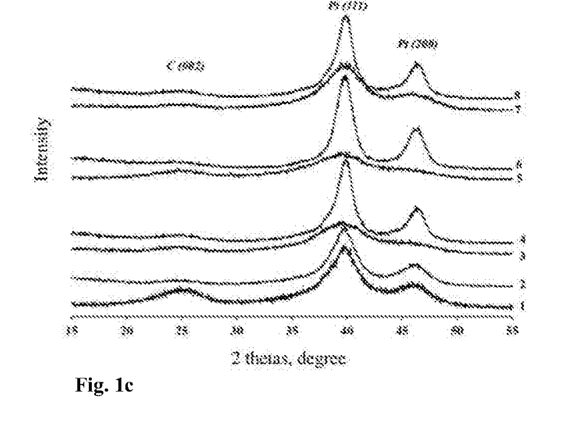
FIG. 1c shows X-ray diffraction patterns of commercial Pt/C catalysts HiSPEC 3000 (1) and HiSPEC 6000 (2); Pt/C samples produced with the use of formic acid (FA) as the reducing agent (3, 4), ethylene glycol (EG) (5, 6), formaldehyde (F) (7, 8) in an $NO_2$ atmosphere (3, 5, 7) and in an air atmosphere (4, 6, 8).
Figure 2:
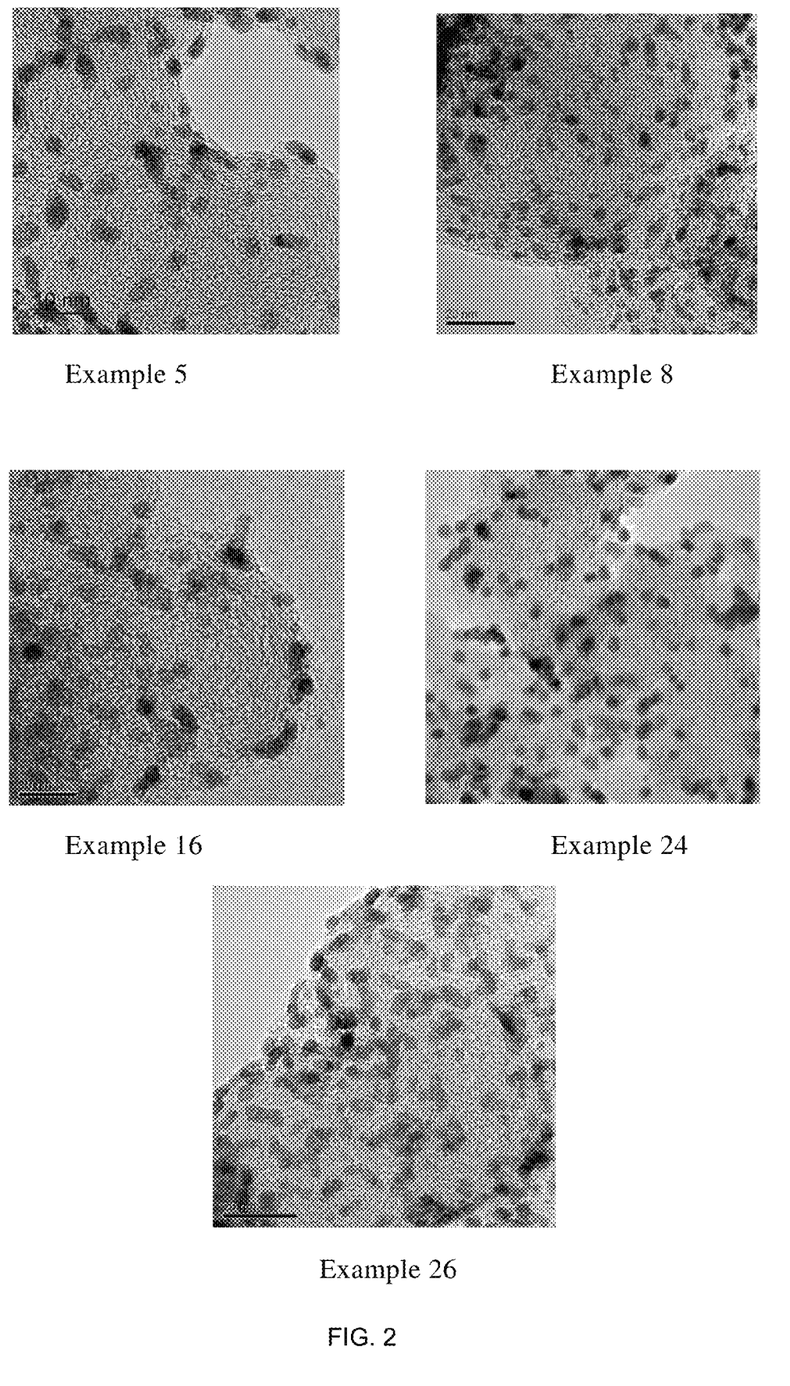
FIG. 2 shows TEM (transmission electron microscopy) high resolution photographs of samples corresponding to Examples 5, 8, 16, 24, 26.
Figure 3:
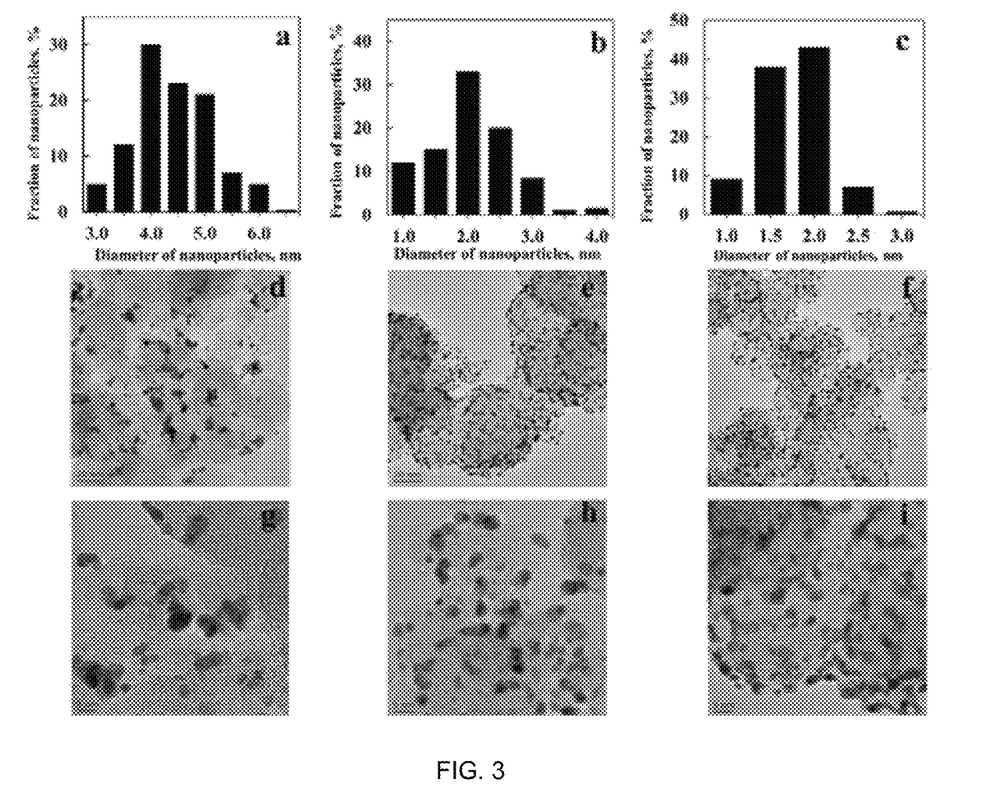
FIG. 3 shows TEM microphotographs of samples of FA (a, d, g), $FA_{NO2}$ (b, d, h), $EG_{NO2}$ (c, f, i) and histograms of nanoparticle size distribution.

As follows from a comparison of the X-ray diffraction patterns shown in FIG. 1a and FIG. 1b, and the results of purging electron microscopy shown in FIG. 2 and FIG. 3, the average size of platinum nanoparticles in Pt/C materials produced with gas purging is smaller, and the dispersion of the particle size distribution is narrower than in analogs produced under the same conditions but without purging the corresponding gases (Tables 1, 2).

Figure 4:
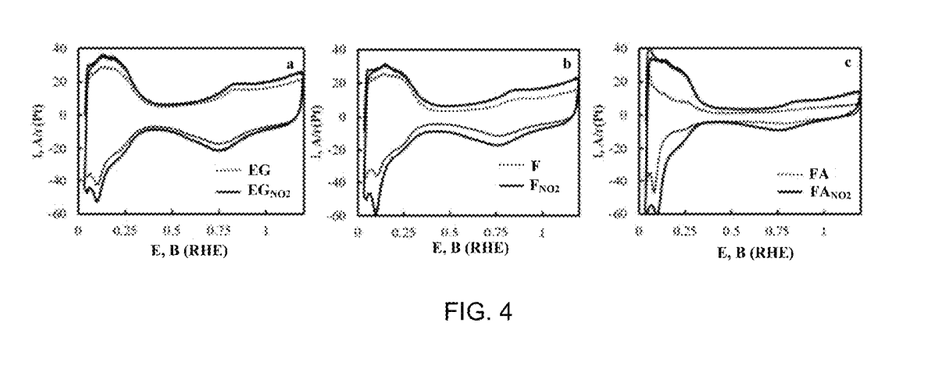
FIG. 4 shows cyclic voltammograms of Pt/C samples produced with the use of EG (1), F (2), FA (3) as the reducing agent. Samples produced in an air atmosphere are shown by a dot line, those produced in an $NO_2$ atmosphere are shown by a solid line. Potential sweep speed is 20 mV/s. $2^{nd}$ cycle. The electrolyte is a 0.1M solution of $HClO_4$ saturated with argon.

As follows from the results of the calculations performed for the cyclic voltammograms taken on Pt/C catalysts and presented in FIG. 4, the area of the electrochemically active surface of platinum in Pt/C materials produced in an $NO_2$ atmosphere is larger than that in a commercial HiSPEC 3000 catalyst with comparable loading of platinum and in analogs synthesized in the same conditions but without purging $NO_2$ (Tables 1, 2). The specific activity of the catalysts in the oxygen electroreduction reaction (A/g (Pt)) is also greater than that of the commercial Pt/C catalyst and analogs with a similar mass fraction of platinum produced in the same conditions (Table 2).

According to the results of calculating the average nanoparticles size, as performed according to the obtained X-ray diffraction patterns, the longer a time interval between the start of synthesis (bringing the reaction mixture to a predetermined temperature) and the start of purging the $NO_2$ stream through the reaction mixture, the larger the size of platinum nanoparticles (Table 1).

Figure 5:
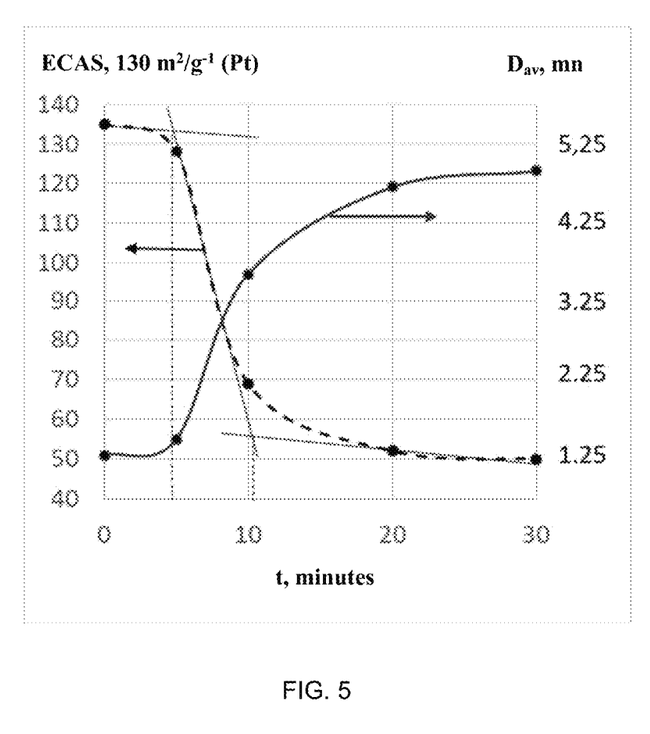
FIG. 5 illustrates dependence of an average size of platinum crystallites and an area of the electrochemically active surface of Pt/C catalysts on time purged from the start of synthesis to the start of purging $NO_2$. The reducing agent is formic acid.

As follows from the results of the calculations performed on cyclic voltammograms taken on Pt/C catalysts, the smaller is the area of the electrochemically active surface of platinum in the produced Pt/C materials, the longer is a time interval between the start of synthesis (bringing the reaction mixture to a given temperature) and the start of purging a stream of $NO_2$ through the reaction mixture (FIG. 5).

The proposed method allows producing catalysts with nanocrystals of platinum or its alloys fixed to a foreign carrier with an average nanoparticles size of 1-5 nm, a narrow size distribution of nanoparticles, a platinum mass fraction of 8-60%, and a combined electrochemically active surface area of 50-185 $m^2/g$ (Pt) of platinum nanoparticles with uniform distribution of platinum nanoparticles on the surface of the carbon carrier. The activity of the produced Pt/Cu PtM/C catalysts (A/g (Pt)) in the oxygen electroreduction reaction exceeds the activity of the HiSPEC3000 and HiSPEC4000 commercial analogs (JohnsonMatthey).

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

TABLE 1

| No. | Carrier | Temperature, °C. | Purged gas and time of start of purging, minutes | Reducing agent used during synthesis | Platinum mass fraction in catalyst, wt % | Average diameter of nanoparticles, nm (acc. to XRF results) | Area of catalyst electrochemically active surface, $m^2/g$ (Pt) |
|---|---|---|---|---|---|---|---|
| 1 | Vulcan XC-72 | 90 | $NO_2$ 0 | FA | 15 | 1.3 | 135 |
| 2 | Vulcan XC-72 | 90 | $NO_2$ 0 | FA | 27 | 1.8 | 93 |
| 3 | Vulcan XC-72 | 90 | $NO_2$ 0 | FA | 57 | 3.0 | 68 |
| 4 | Vulcan XC-72 | 98 | $NO_2$ 0 | EG | 17 | 1.2 | 130 |
| 5 | Vulcan XC-72 | 90 | $NO_2$ 0 | FA | 38 | 2.4 | 79 |
| 6 | Vulcan XC-72 | 90 | $NO_2$ 0 | FA | 8 | 1.0 | 152 |
| 7 | Vulcan XC-72 | 65 | $NO_2$ 0 | FA | 18 | 1.4 | 105 |
| 8 | Vulcan XC-72 | 90 | $NO_2$ 5 | FA | 16 | 1.5 | 128 |
| 9 | Vulcan XC-72 | 90 | $NO_2$ 10 | FA | 16 | 3.6 | 69 |
| 10 | Vulcan XC-72 | 90 | $NO_2$ 20 | FA | 19 | 4.7 | 52 |
| 11 | Vulcan XC-72 | 90 | $NO_2$ 30 | FA | 19 | 4.9 | 50 |
| 12 | Vulcan XC-72 | 90 | CO 20 | FA | 17 | 4.6 | 55 |
| 13 | Vulcan XC-72 | 80 | $CO_2$ 0 | FA | 44 | 3.0 | 68 |
| 14 | Vulcan XC-72R | 80 | $CO_2$ 0 | FA | 43 | 3.1 | 67 |
| 15 | Ketjen black EC 600JD | 90 | $NO_2$ 0 | FA | 28 | 1.6 | 109 |
| 16 | Vulcan XC-72* | 90 | $NO_2$ 0 | FA | 29 | 1.8 | 92 |
| 17 | Ketjen black EC 600JD* | 90 | $CO_2$ 0 | FA | 30 | 3.2 | 66 |
| 18 | Vulcan XC-72* | 90 | $NO_2$ 0 | FA | 28 | 1.9 | 88 |
| 19 | Ketjen black EC 300J | 90 | $NO_2$ 0 | FA | 60 | 2.8 | 74 |
| 20 | BlackPearl 2000 | 90 | $NO_2$ 0 | FA | 59 | 2.7 | 79 |
| 21 | Vulcan XC-72 | 90 | $NO_2$ 0 | F | 18 | 1.4 | 107 |
| 22 | Vulcan XC-72 | 98 | NO 0 | EG | 15 | 1.2 | 127 |

TABLE 1-continued

| No. | Carrier | Temperature, °C. | Purged gas and time of start of purging, minutes | Reducing agent used during synthesis | Platinum mass fraction in catalyst, wt % | Average diameter of nanoparticles, nm (acc. to XRF results) | Area of catalyst electrochemically active surface, m$^2$/g (Pt) |
|---|---|---|---|---|---|---|---|
| 23 | Ti$_{1-x}$Nb$_x$O$_2$ | 98 | NO 0 | EG | 19 | 1.2 | 72 |
| 24 | Sb$_x$Sn$_{1-x}$O$_2$ | 98 | NO 0 | EG | 18 | 1.1 | 81 |
| 25 | Vulcan XC-72 | 98 | NO 0 | SB | 18 | 2.8 | 72 |
| 26 | Vulcan XC-72 | 98 | NO 0 | SB | 17 | 2.2 | 90 | where: FA - formic acid, EG - ethylene glycol, F - formaldehyde, SB - NaBH$_4$

TABLE 2

| Example No. | Reducing agent used in Pt/C synthesis | Atmosphere for synthesis | Mass fraction of platinum in Pt/C catalyst, wt % | Average diameter of nanoparticles, nm (acc. to XRF results) | Area of electro-chemically active surface of catalyst, m$^2$/g (Pt) | Ratio of kinetic currents of oxygen electroreduction on catalyst and on comparative HiSPEC3000 commercial catalyst (JohnsonMatthey) (mA/g (Pt)) at E = 0.90 V (rel. to RHE) |
|---|---|---|---|---|---|---|
| — | Formic acid | Air | 15.3 | 4.8 | 50 | 0.23 |
| 1 | Formic acid | NO$_2$ | 15.2 | 1.3 | 135 | 1.28 |
| — | Ethylene glycol | Air | 18 | 3.8 | 67 | 0.82 |
| 4 | Ethylene glycol | NO$_2$ | 16.5 | 1.2 | 130 | 1.31 |
| — | Formaldehyde | Air | 17.3 | 2.5 | 80 | 0.98 |
| 21 | Formaldehyde | NO$_2$ | 18 | 1.4 | 107 | 1.15 |
| | HiSPEC-3000 commercial catalyst (Johnson Matthey) | | 20 | 2.8 | 91 | 1.00 |
| | HiSPEC-4000 commercial catalyst (Johnson Matthey) | | 40 | 3.2 | 85 | 0.90 |

What is claimed is:

1. A method for producing catalysts with nanoparticles of platinum or its alloys with metals, for a cathode and an anode of low-temperature fuel cells and electrolyzers, wherein each alloy comprises platinum and at least one metal, comprising:

preparation of a solution of chloroplatinic acid or a mixture of chloroplatinic acid with at least one metal salt in water or in an aqueous organic solvent;

mixing thereof with dispersed carbon or non-carbon carriers, or their mixtures, or compositions with specific surface area of more than 60 m$^2$/g;

dispersing the obtained mixture to obtain a suspension;

alkalizing to a pH between 6 and 11 of said suspension;

wherein gas selected from the group consisting of: nitrogen oxides, carbon dioxide (CO$_2$), sulfur oxide (SO$_2$), ammonia (NH$_3$), and their mixtures is purged through the obtained suspension at a temperature of the obtained suspension in a range from 5 to 98° C., to produce said catalysts with nanoparticles of platinum or its alloys with metals, and wherein said catalysts are suited for said cathode and said anode of said low-temperature fuel cells and said electrolyzers, wherein nitrogen oxides are N$_2$O, NO, and NO$_2$; and adjusting a time interval occurring between said preparation of said solution of chloroplatinic acid or said mixture of chloroplatinic acid with said at least one metal salt in said water or in said aqueous organic solvent and when said selected gas is purged therethrough, to produce said catalysts with said nanoparticles of platinum or its alloys with metals, for said cathode and said anode of said low-temperature fuel cells and electrolyzers.

* * * * *